(12) United States Patent
Davis et al.

(10) Patent No.: US 11,065,825 B2
(45) Date of Patent: Jul. 20, 2021

(54) HIGH TEMPERATURE COMPOSITE SEAL

(71) Applicant: United Technologies Corporation, Farmington, CT (US)

(72) Inventors: Kerry Lynn Davis, Enfield, CT (US); William Bogue, Hebron, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 396 days.

(21) Appl. No.: 16/210,528

(22) Filed: Dec. 5, 2018

(65) Prior Publication Data
US 2020/0180235 A1 Jun. 11, 2020

(51) Int. Cl.
*B29C 65/00* (2006.01)
*B29C 35/02* (2006.01)
*B29C 65/02* (2006.01)
*B29K 79/00* (2006.01)

(52) U.S. Cl.
CPC .............. *B29C 66/55* (2013.01); *B29C 35/02* (2013.01); *B29C 65/02* (2013.01); *B29C 66/004* (2013.01); *B29C 66/022* (2013.01); *B29C 66/522* (2013.01); *B29K 2079/08* (2013.01); *B29K 2313/00* (2013.01)

(58) Field of Classification Search
CPC ..... B29C 66/55; B29C 66/004; B29C 66/022; B29C 66/522; B29C 35/02; B29C 65/02; B29K 2079/08; B29K 2313/00; F16J 15/3284; F01D 11/005; F05D 2240/55
See application file for complete search history.

(56) References Cited

U.S. PATENT DOCUMENTS

| 4,411,589 A | * | 10/1983 | Joubert | ................. F01D 21/045 |
| | | | | 415/121.2 |
| 2009/0148275 A1 | | 6/2009 | Bogue | |
| 2010/0158676 A1 | | 6/2010 | Bottome | |
| 2015/0064000 A1 | * | 3/2015 | Yagi | ........................ F01D 9/042 |
| | | | | 415/209.3 |

(Continued)

FOREIGN PATENT DOCUMENTS

| CN | 102532896 | 7/2012 |
| EP | 1024252 | 8/2000 |

(Continued)

OTHER PUBLICATIONS

EP Search Report for EP Application No. 19212610.0 dated Apr. 30, 2020.

*Primary Examiner* — Gilbert Y Lee
(74) *Attorney, Agent, or Firm* — Carlson, Gaskey & Olds, P.C.

(57) ABSTRACT

A method of sealing a first component to a second component comprising the steps of locating at least one fiber reinforced polyimide resin layer against a first sealing surface on a first component and against a second sealing surface on a second component. At least one fiber reinforced polyimide resin layer is compressed against the first sealing surface and the second sealing surface prior to curing at least one fiber reinforced polyimide resin layer. At least one fiber reinforced polyimide resin layer is heated to promote flow and conformation to the first sealing surface and the second sealing surface. At least one fiber reinforced polyimide resin layer is cured to provide a fluid tight seal between the first component and the second component.

20 Claims, 6 Drawing Sheets

(56) References Cited

U.S. PATENT DOCUMENTS

| | | | |
|---|---|---|---|
| 2015/0118036 A1* | 4/2015 | Ohtani | F04D 29/526 415/200 |
| 2015/0132118 A1* | 5/2015 | Inada | F01D 25/005 415/200 |
| 2016/0033040 A1 | 2/2016 | Lancaster | |

FOREIGN PATENT DOCUMENTS

| JP | 2015025404 | 2/2015 |
|---|---|---|
| WO | 20150994420 | 6/2015 |

* cited by examiner

HIGH TEMPERATURE COMPOSITE SEAL

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

As gas turbine engines are becoming more efficient, they are operating at higher temperatures. This requires the various components of the gas turbine engine to be able to operate at higher temperatures. In particular gas turbine engine fluid and air system seal requirements are surpassing the capability of perfluoroelastomers compounds at these elevated temperatures. Some seals, such as graphite or ceramic seals, can withstand high temperatures, but are susceptible to fluid leaks being less conformable than the elastomeric materials. Other elastomeric seals may perform better at reducing fluid leaks, but can soften, degrade or yield decomposition products adverse to adjacent components when exposed to elevated temperatures, such as temperatures from 550 to 750 degrees Fahrenheit. Other seals, such as elastomeric seals, specifically fluoroelastomers and perfluoroelastomers, run the risk of releasing fluorinated compounds which may not be suitable for use with titanium at temperatures around 550 degrees Fahrenheit or higher. Therefore, there is a need for a seal that can withstand high temperatures while still preventing fluid leaks.

SUMMARY

In one exemplary embodiment, a method of sealing a first component to a second component comprising the steps of locating at least one fiber reinforced polyimide resin layer against a first sealing surface on a first component and against a second sealing surface on a second component. At least one fiber reinforced polyimide resin layer is compressed against the first sealing surface and the second sealing surface prior to curing at least one fiber reinforced polyimide resin layer. At least one fiber reinforced polyimide resin layer is heated to promote flow and conformation to the first sealing surface and the second sealing surface. At least one fiber reinforced polyimide resin layer is cured to provide a fluid tight seal between the first component and the second component.

In a further embodiment of any of the above, the first component is compressed towards the second component to a predetermined force after at least one fiber reinforced polyimide resin layer has cured.

In a further embodiment of any of the above, at least one fiber reinforced polyimide resin layer is heated to between 600 degrees Fahrenheit and less than 750 degrees Fahrenheit.

In a further embodiment of any of the above, the first component and the second component transport one of a fuel, lubricating oil, or hydraulic fluid.

In a further embodiment of any of the above, at least one fiber reinforced polyimide resin layer includes fibers forming at least one of a fabric or a braid.

In a further embodiment of any of the above, the first component and the second component contribute to communicating at least one of bleed air, fuel, or lubricant in a gas turbine engine.

In a further embodiment of any of the above, the first component is disassembled from the second component during service by separating the first component from the second component after the at least one fiber reinforced polyimide resin layer has cured while maintaining the first component and the second component in a reusable condition.

In a further embodiment of any of the above, at least one second fiber reinforced polyimide resin layer is located against the first sealing surface of the first component and against the second sealing surface of the second component. At least one second fiber reinforced polyimide resin layer is compressed against the first sealing surface and the second sealing surface prior to curing at least one second fiber reinforced polyimide resin layer. At least one second fiber reinforced polyimide resin layer is heated to conform to the first sealing surface and the second sealing surface. At least one fiber reinforced polyimide resin layer is cured to provide a fluid tight seal between the first component and the second component.

In a further embodiment of any of the above, at least one of the first sealing surface and the second sealing is coated with an adhesion reducing material at least one of a frangible oxide, a frangible primer, a non-adherent film, or a non-adherent coating.

In a further embodiment of any of the above, an outer diameter of the first component is less than an inner diameter of the second component.

In a further embodiment of any of the above, the first sealing surface is located on a first component flange and the second sealing surface is located on a second component flange.

In a further embodiment of any of the above, the first sealing surface is located on the outer diameter of the first component and the second sealing surface is located on the inner diameter of the second component.

In a further embodiment of any of the above, the first component is isolated from the second component with at least one fiber reinforced polyimide resin layer to prevent material reactions between the first component and the second component.

In a further embodiment of any of the above, at least one of the first sealing surface and the second sealing surface includes at least one of a surface irregularity and the at least one fiber reinforced polyimide resin layer conforms to the irregularity.

In another exemplary embodiment, a gas turbine engine assembly includes a first component that includes a first sealing surface. A second component includes a second sealing surface. The second component is in fluid communication with the first component. A seal engages the first sealing surface and the second sealing surface and forms a fluid connection between the first component and the second component. The seal includes at least one fiber reinforced polyimide resin layer in a cured state that follows a profile of the first sealing surface and a profile of the second sealing surface.

In a further embodiment of any of the above, at least one of the first sealing surface and the second sealing surface includes at least one of a surface irregularity. The seal at least partially conforms to the surface irregularities.

In a further embodiment of any of the above, at least one of the first sealing surface and the second sealing surface are coated with at least one of the following adhesion reducing materials: a frangible oxide, a frangible primer, a non-adherent film, or a non-adherent coating.

In a further embodiment of any of the above, at least one fiber reinforced polyimide resin layer prevents material reactions between the first component and the second component.

In a further embodiment of any of the above, the first sealing surface is located on a first component flange and the second sealing surface is located on a second component flange.

In a further embodiment of any of the above, the first sealing surface is located on the outer diameter of the first component. The second sealing surface is located on the inner diameter of the second component.

DETAILED DESCRIPTION

Figure 1:
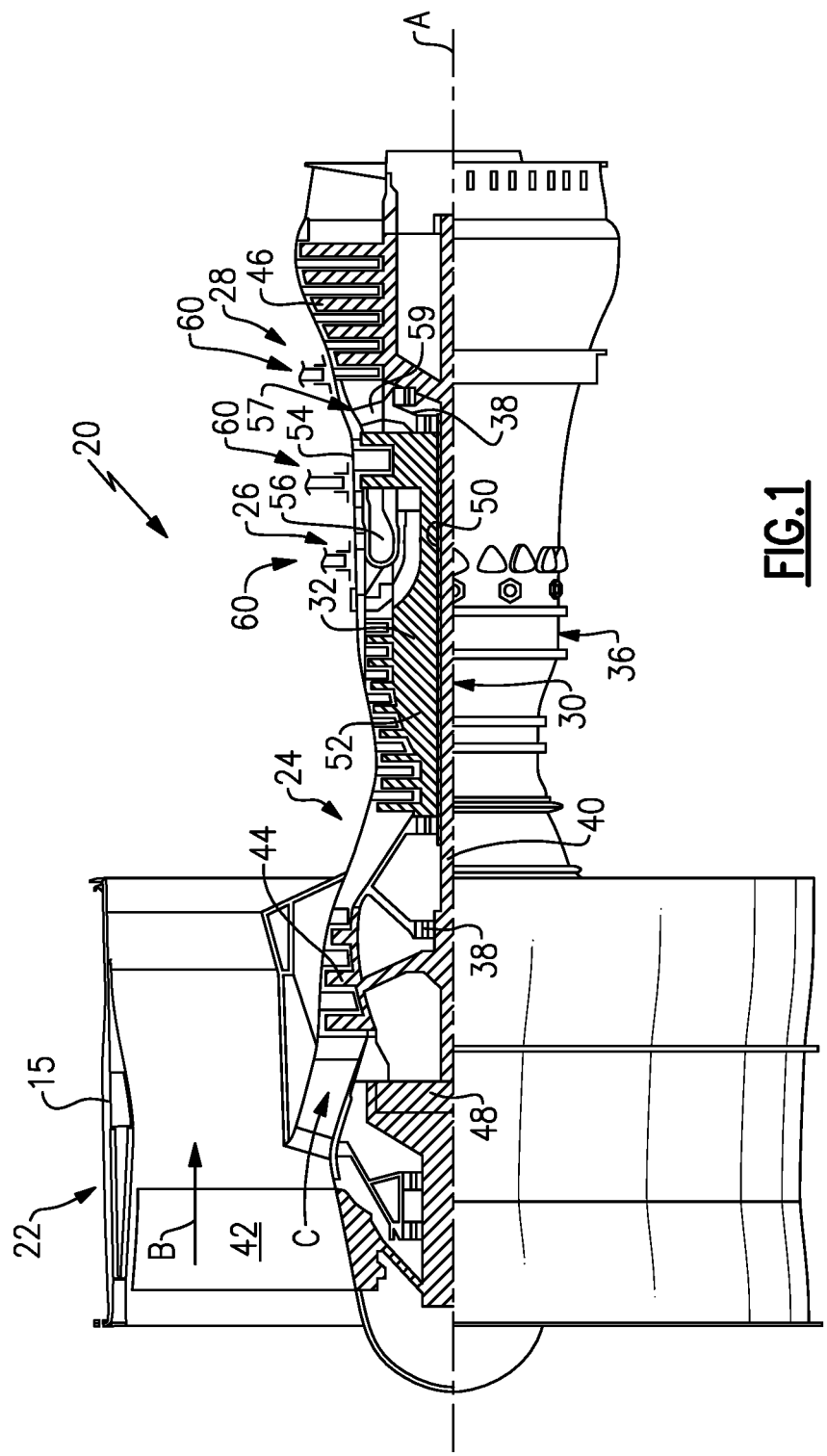
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed"

as disclosed herein according to one non-limiting embodiment is less than about 1150 ft/second (350.5 meters/second).

The gas turbine engine 20 includes multiple fluid lines, each with fluid connections 60, such as fuel line connections, bleed air connections, hydraulic fluid connections, and lubricant fluid connections, and scavenge air connections for collecting air with scavenged oil. The fluid connections are often located in parts of the gas turbine engine 20 that are subject to elevated temperatures radiating from hot parts, such as the combustor section 26 and the turbine section 28 or from hot fluids within the fluid lines. The temperature in the area of these fluid connections 60 can exceed 550 degrees Fahrenheit and may even exceed 700 degrees Fahrenheit.

Figure 2:
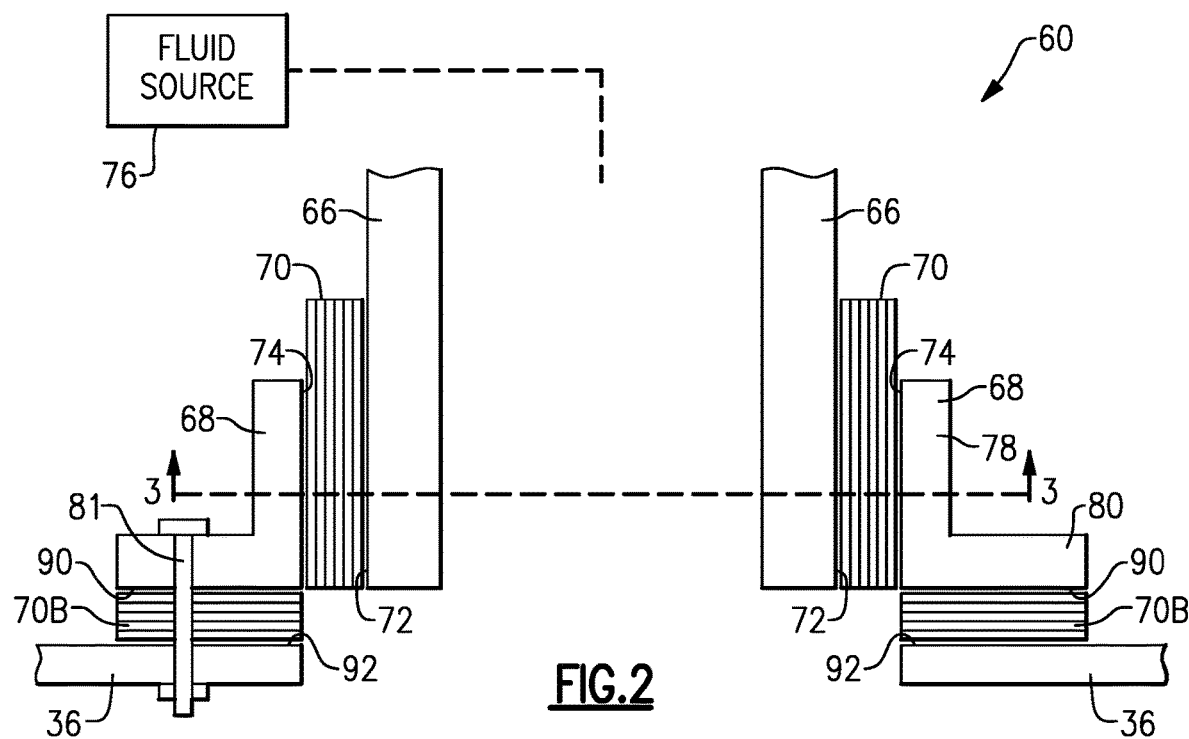
FIG. 2 is a cross-sectional view of a connection in the gas turbine engine.

FIG. 2 is a cross-sectional view of an example fluid connection 60 of FIG. 1. The fluid connection 60 includes a first component 66, a second component 68, and a seal 70 between the first component 66 and the second component 68. In the illustrated examples, the first component 66 includes a fluid line in fluid communication with a fluid source 76, such as a fuel tank or a high pressure fuel pump and the second component 68 includes a fitting. The first component 66 and the second component 68 could be made of the same metallic material or a different metallic material. The metallic material could be steel, titanium, or a nickel based alloy. In the illustrated example, the seal 70 separates the first component 66 from the second component 68. This separation of the first component 66 from the second component 68 is particularly beneficial when the first component 66 and the second component 68 are made of a different metallic materials. In particular, the isolation from galvanic coupling is beneficial when the different metallic materials will interact adversely to each other in a manner such as but not including corrosion.

Figure 3:
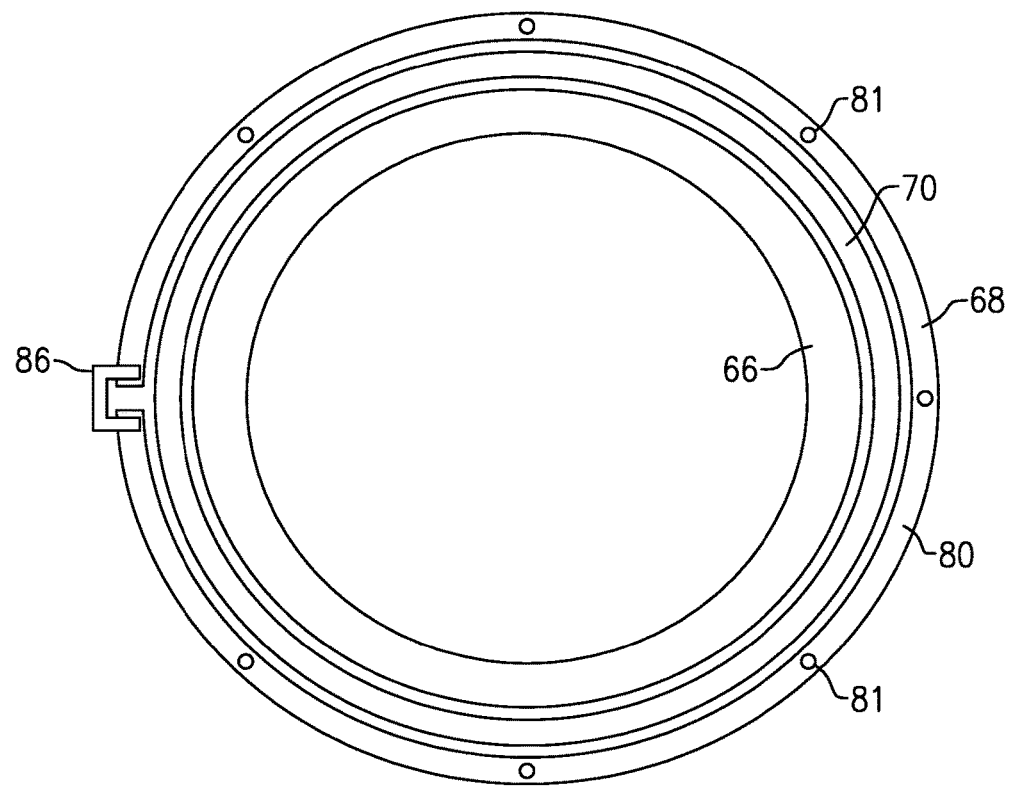
FIG. 3 is a cross-sectional view along line 3-3 of FIG. 2.

As shown in FIGS. 2 and 3, the first component 66 is cylindrical, however, the first component 66 could have other cross sectional shapes suitable for carrying the fluids under the operating pressure range. The first component 66 includes a first sealing surface 72 that mates with the seal 70. The second component 68 includes a cylindrical portion 78 and a flange portion 80 extending from a distal end of the cylindrical portion 78. The flange portion 80 is fastened to the engine static structure 36 through the use of a mechanical fastener 81, such as a bolt. The cylindrical portion 78 includes a second sealing surface 74 on a radially inner side that mates with the seal 70. In the illustrated example of FIG. 2, the seal 70 has already reached a cured state that follows a profile of the first sealing surface 72 and the second sealing surface 74.

A second sealing surface 90 on the second component 68 could also be sealed relative to a sealing surface 92 on the engine static structure 36 through a second seal 70B that is similar to the seal 70 described above. The second component 68 is fixed relative to the engine static structure 36 through bolts 81 that compress the second seal 70B.

Figure 4:
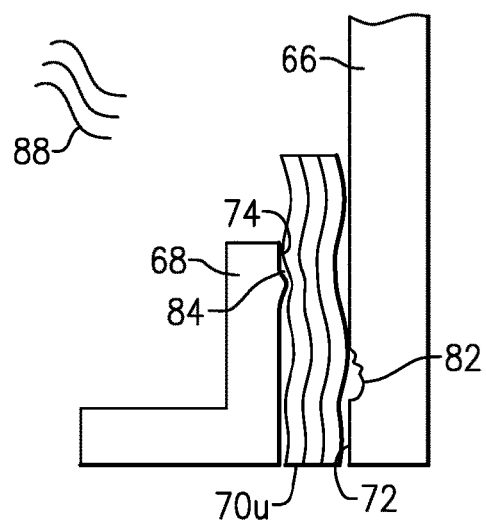
FIG. 4 illustrates the connection of FIG. 2 with surface irregularities during assembly.
Figure 4:
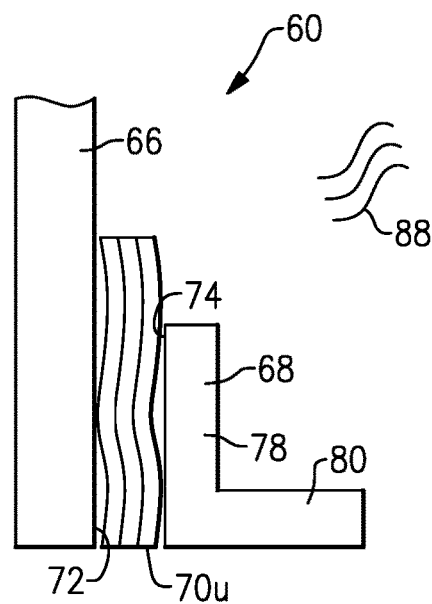

FIG. 4 illustrates a cross-sectional view of the fluid connection 60, prior to curing the seal 70 and connecting with the fluid source 76. Also, the fluid connection 60 includes surface irregularities 82 in the first sealing surface 72 and surface irregularities 84 in the second sealing surface 74. The surface irregularities 82, 84 could be the result of manufacturing the first and second components 66, 68 such as but not limited to asperities or surface roughness or could result from damage or repair of damage occurring along the first or second sealing surfaces 72, 74, respectively. The conformation of the seal 70, typical of an elastomeric seal capability, to be functional with variations in seal thickness across the sealing surfaces also allows the seal 70 to accommodate manufacturing tolerances of both the first and second components 66, 68 including diametric and axial tolerance mismatch as well as out-of-parallel mismatch such as differences in either parallelism or concentricity in assembly or in manufacture of the individual components.

Traditionally, seals used in applications above 550 degrees Fahrenheit were made from a graphite or ceramic material. However, seals made from graphite or ceramic do not follow contours of the first and second sealing surfaces 72, 74 or to fill surface irregularities and asperities 82, 84 well because of the rigidity of the material. This resulted in prior art seals used in applications above 550 degrees Fahrenheit being prone to allow fluid to flow between the first and second sealing surfaces 72, 74 and the seal and result in a fluid leak at the fluid connection 60.

Prior to assembling the first and second components 66, 68 with the seal 70, the first and second sealing surfaces 72, 74 are prepared to provide sufficient level of adhesion with the uncured seal 70. In particular, it is desirable to have the first and second components 66, 68 able to be separated from each other without destroying either the first or second component 66, 68. The second sealing surface 90 on the second component 68 and the sealing surface on the engine static structure 36 are prepared in a similar manner as the first and second sealing surfaces 72, 74.

Conventionally, the intent of bond surface preparation is to maximize strength and durability of the adhesion at the substrate to adhesive interface. In order to improve the strength and durability, bond surfaces are typically cleaned of surface oxides and degreased in order to remove organic surface contaminants by promoting improved adhesion via chemical bonding. However, because it is desirable to maintain that the first and second components 66, 68 be separable from the seal 70 and each other during maintenance of the gas turbine engine 20, the preparation of the first and second sealing surfaces 72, 74 will not be done strictly per the above best practices.

Methods to limit the capability of the adhesion at the first and second sealing surfaces 72, 74 are related to limiting the extent of mechanical and/or chemical adhesion. In regards to mechanical adhesion, there might be some applications where the condition of the first and second sealing surfaces 72, 74 would be roughened such as by abrasion, to promote mechanical adhesion and also improving sealing capability by increasing the effective path length over the surface resisting the fluid pressure from inducing leakage. Limiting the surface roughening of the mating surfaces would decrease mechanical adhesion and is often needed for sealing materials that cannot sufficiently conform to the surface to take advantage of the increased area.

Chemical and dispersive adhesion applies for bonded joints and acts in conjunction with mechanical adhesion. The strength of the bonding contributed by these aspects of adhesion can be limited by providing a surface that inhibits or prevents chemical bonding or physiosorption. One way to inhibit bonding is to not remove a pre-existing surface layer such as an oxide on first and second sealing surfaces 72, 74 or intentionally form additional or thicker layer of oxides on at least one of the first and second sealing surfaces 72, 74. It is recognized that oxidized surfaces of polymers is intended to be included in the general category of oxides above. Another way to inhibit chemical bonding is to apply a frangible layer to the sealing surfaces such as a brittle primer or ceramic/oxide layer. A third way to inhibit chemical and dispersive adhesion is to apply a non-adherent film or coating, durable over the operating range of the joint, such as a dry film lubricant. The frangible layer or non-adherent film/coat may be selectively incomplete over the gasket contact surfaces in a pattern such as concentric bands that do not have continuous path from high to low pressure side of the joint, thereby maintaining the fluid tightness while providing for natural fault lines allowing for future separation of the sealing surfaces. Omitting the degreasing step prior to mating surfaces is another way to minimize the adhesion at the substrate surface by keeping the non-adherent film already present from engine operation on the surface without having to add a new film. Typically, good chemical bonds fail within the layer of adhesive, not at the bond interface or within the surface treatment. By using a frangible layer or by pre-faulting the mating surfaces, the failure will be designed to be at the interface between the seal 66 and the surface 72, 74 or in the surface pre-treatment. This failure mechanism is what allows the seal and mating surfaces to be separable while still allowing the one or both of the sealing surfaces 72, 74 to be re-used.

After the first and second sealing surfaces 72, 74 have been prepared, a desirable number of layers fiber reinforced polyimide resin are placed between the first and second component 66, 68. The number of plies of fiber reinforced polyimide resin is dependent on the following: the desired size of the seal, the needed separation distance for galvanic isolation, the needed volume of material to fill surface irregularities. The fiber reinforced polyimide resin requires less compression set than materials without fiber reinforcement, thickness is more easily adjustable (can be built up thicker than just resin), and handling is easier than uncured resin. The fabric itself also gives flexibility, for example, the fabric can be constructed with different architectures, like braids or weaves.

Once the first and second components 66, 68 have been assembled with the seal 70, a clamping force is applied with a clamp 86 (FIG. 3) to opposing ends of the second component 68 that draws the opposing ends together and compresses the seal 70 against the first and second sealing surfaces 72, 74. After a predetermined clamping force has been applied to the seal 70, the first and second components 66, 68 along with the seal 70 are heated to a point where the polyimide resin flows and imidizes. In one example, this requires heating the first and second components 66, 68 and the seal 70 to a temperature greater than 600 degrees Fahrenheit and less than 750 degrees Fahrenheit. In another example, the first and second components 66, 68 and the seal 70 are heated to a temperature between 600 degrees Fahrenheit and 700 degrees Fahrenheit.

Figure 5:
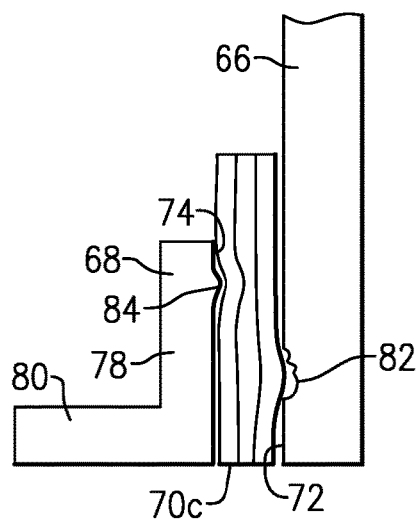
FIG. 5 illustrates the connection of FIG. 2 with surface irregularities assembled.
Figure 5:
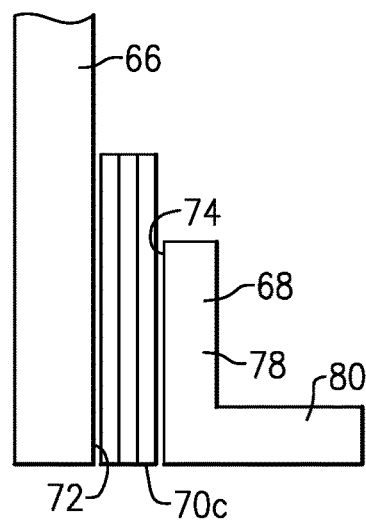

Once the resin in the seal 70 is flowing, the seal 70 will follow a profile of the first and second sealing surfaces 72, 74 and fill any surface irregularities 82, 84 that may be present in the first and second sealing surfaces 72, 74 as shown in FIG. 5. After the first and second components 66, 68 and the seal 70 have been heated to a point where the seal 70 flows and the seal 70 is allowed to cure. The second component 68 may need to have additional clamping force applied to a predetermined torque to account for the change in shape of the seal 70. Although the illustrated example shows a clamping force being applied to the second component 68, the first and second components 66, 68 could have different profiles and a clamping force could be applied to the first component 66 as long as it compresses the seal 70 against the first and second sealing surfaces 72, 74.

When the first component 66 needs to be separated from the second component 68, such as during maintenance of the gas turbine engine 20, the first and second components 66, 68 are able to be separated from each other. The ability to separate the first and second components 66, 68 from each other is partially due to the steps taken above to limit the capability of the adhesion between first component 66 and the seal 70 and the second component 68 and the seal 70. In particular, the preparation of the first and second sealing surfaces 72, 74 to reduce adhesion contributes to separation of the first and second components 66, 68. Because the first and second components 66, 68 are intended to be separated, the seal 70 forms a non-structural connection.

Once the first and second components 66, 68 are separated from each other by the application of a separating force such as introducing relative motion between the components 66, 68, there may be remnants of the seal 70 material on the first and second sealing surfaces 72, 74. The remnants of the seal 70 can be removed by methods such as, but not limited to, sanding, scraping, or grinding before the first and second components are reattached by following the above method again. Also, because the above method can account for surface irregularities in the first and second sealing surfaces 72, 74, damage introduced during separation and removal of remnants of the seal 70 will not reduce the ability of the seal 70 to form a fluid tight connection again between the first component and the cured seal and the second component and cured seal. Therefore, this process can be repeated for the lifetime of the part.

Figure 6:
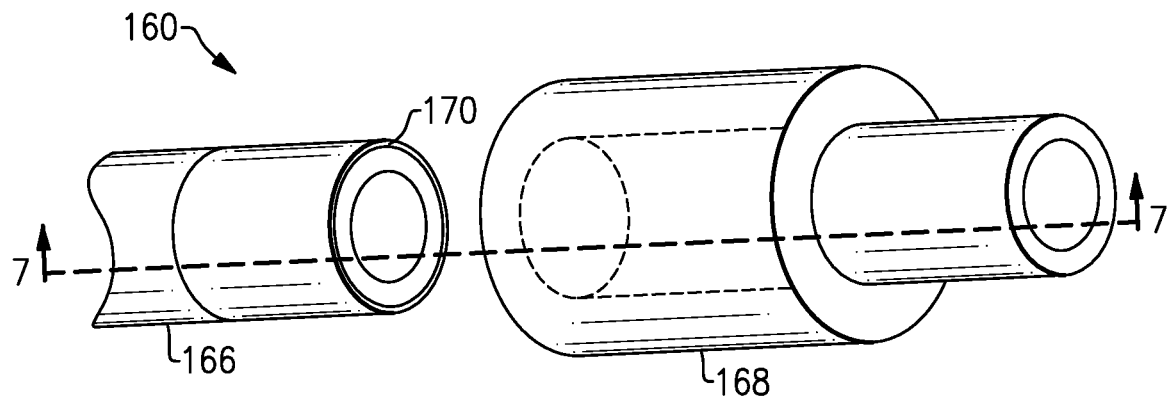
FIG. 6 illustrates another example connection.
Figure 7:
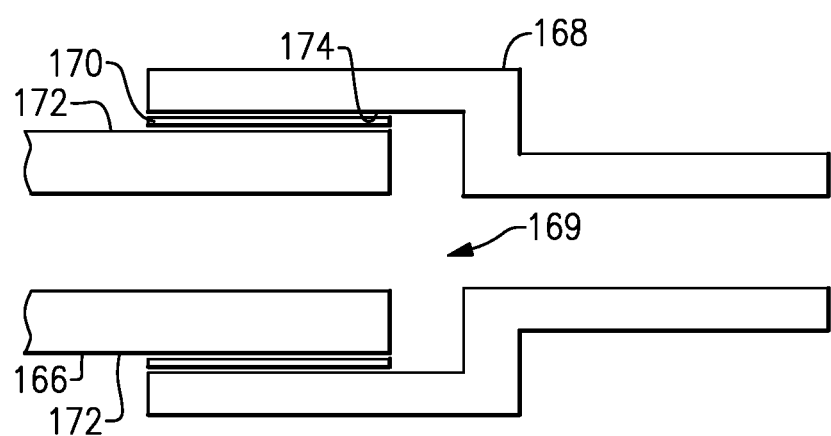
FIG. 7 illustrates a cross-sectional view along line 7-7 of FIG. 6.

FIGS. 6 and 7 illustrate another example connection 160 formed by the method described above. The connection 160 is similar to the connection 60 except where described below or shown in the Figures. The fluid connection 160 includes a first component 166 that is accepted within an opening 169 in a second component 168. A seal 170 is located adjacent a first sealing surface 170 on the first component 166 and a second sealing surface 174 on the second component 168. In one example, the first component 166 is received within the second component 168 by heating the second component 168 to expand the opening 169 and/or chilling the first component 166 to create more clearance with the opening 169. The seal 170 then becomes compressed when the first component 166 and the second component 168 return to ambient temperatures. Once the first and second components are fit together, any excess seal 170 material protruding from the opening 169 can be trimmed before the connection 160 is heated and cured as described above.

Figure 8:
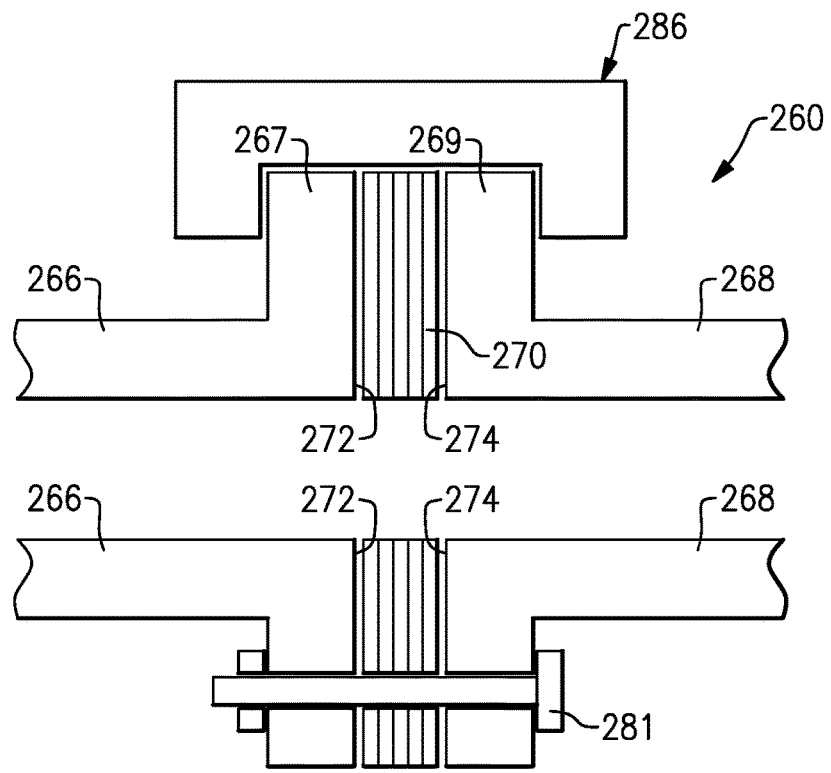
FIG. 8 illustrates yet another example connection.

FIG. 8 illustrates another example connection 260 formed by the method described above. The connection 260 is similar to the connection 60 except where described below or shown in the Figures. The fluid connection 260 includes a first component 266 having a first component flange 267 and a second component 268 having a second component flange 269. A seal 270 is located between a first sealing surface 272 on the first component flange 267 and a second sealing surface 274 on the second component 269. The first component flange 267 and the second component flange 269 are compressed together through the use of a clamp 286 or bolts 281. Once the first and second components 266, 268 are compressed together, the connection 260 is heated and cured as described above.

Figure 9:
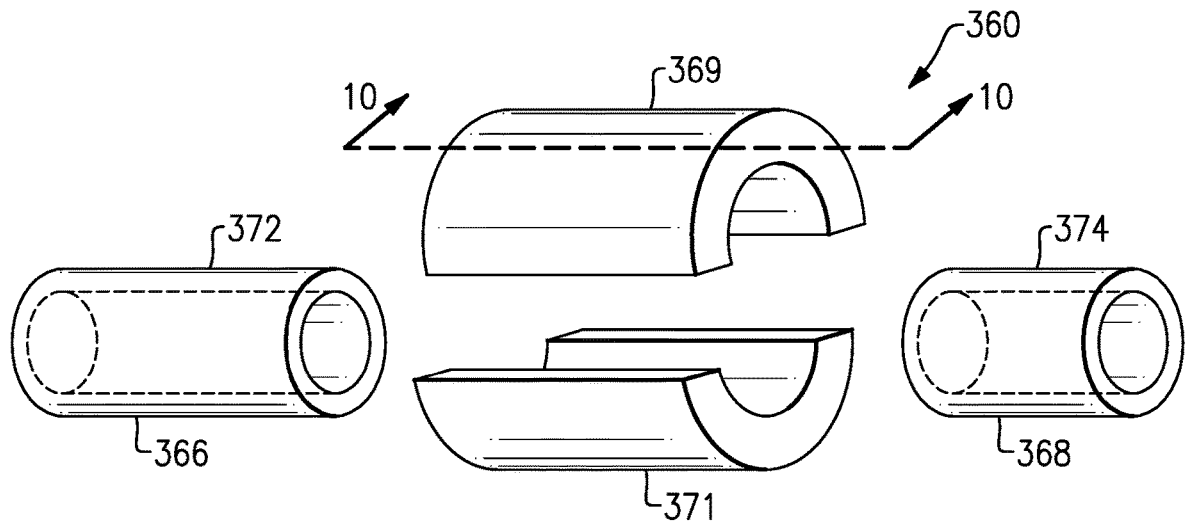
FIG. 9 illustrates a further example connection.
Figure 10:
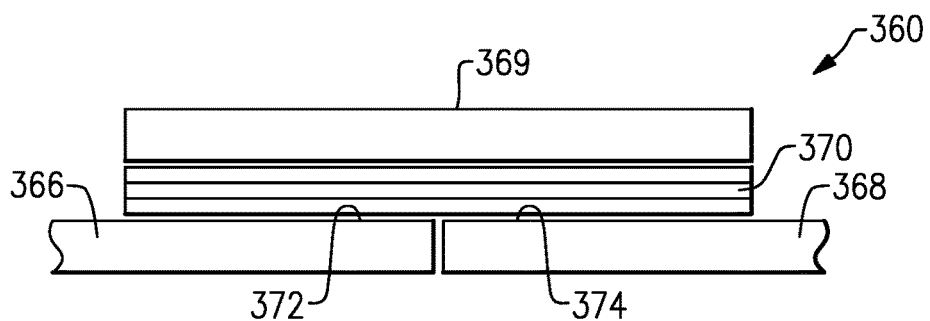
FIG. 10 illustrates a cross-sectional view of connection of FIG. 9.
Figure 10:
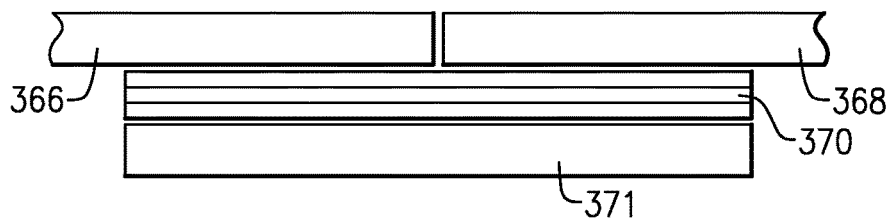

FIGS. 9 and 10 illustrate yet another example connection 360 formed by the method described above. The connection 360 is similar to the connection 60 except where described below or shown in the Figures. The fluid connection 360 includes a first component 366 having a first sealing surface 372 and a second component 368 having a second sealing surface 374. A first sleeve half 369 and a second seal half 371 compress a seal 370 against the first and second components 366 and 368 to create a fluid tight seal between the first component 366 and the second component 368. Once the first and second sleeve halves 370, 371 are compressed together against the seal 370, the connection 360 is heated and cured as described above.

Figure 11:
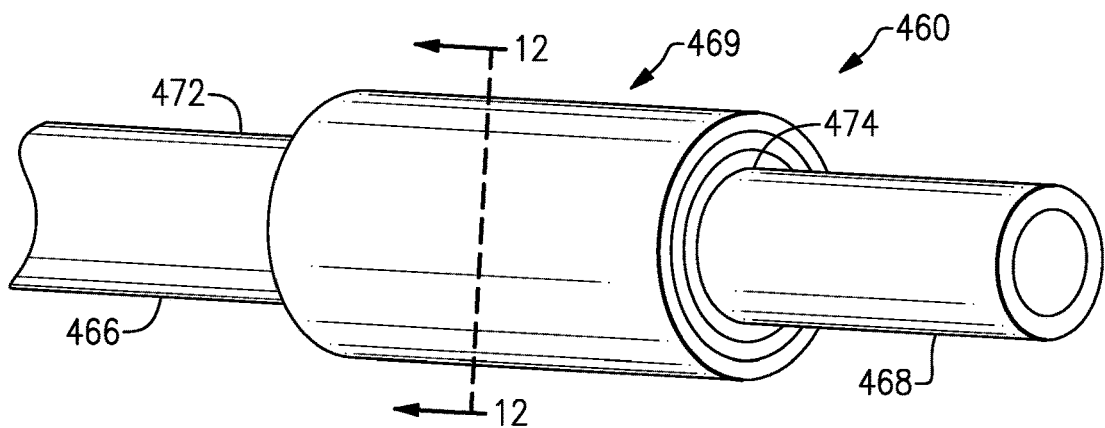
FIG. 11 illustrates yet a further example connection.
Figure 12:
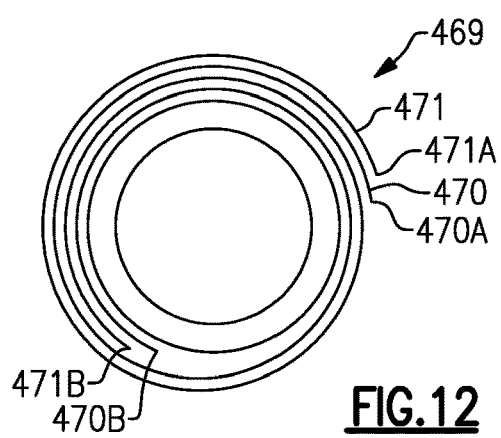
FIG. 12 illustrates a cross-sectional view along line 12-12 of FIG. 11.

FIGS. 11 and 12 illustrate yet another example connection 460 formed by the method described above. The connection 460 is similar to the connection 60 except where described below or shown in the Figures. The fluid connection 460 includes a first component 466 having a first sealing surface 472 and a second component 468 having a second sealing surface 474. A sealing wrap 469 surrounds the first and second components 466, 468. The sealing wrap 469 includes a seal 470 having a first end 470A and a second end 470B and a metal sheet 471 having a first end 471A and a second end 471B. The first ends 470A and 471A are staggered relative to each other such that the first end 470A extends past the first end 471A. Similarly, the second end 470B extends past the second end 471B such that the metal sheet 471 does not contact either the first component 466 or the second component 468. As the sealing wrap 469 is wound tighter, the seal 470 is compressed against the first and second components 466, 468. Once the seal 470 is adequately compressed against the first and second components 466, 468, the connection 460 is heated and cured as described above.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of sealing a first component to a second component comprising the steps of:
    locating at least one fiber reinforced polyimide resin layer against a first sealing surface on a first component and against a second sealing surface on a second component;
    compressing the at least one fiber reinforced polyimide resin layer against the first sealing surface and the second sealing surface prior to curing the at least one fiber reinforced polyimide resin layer;
    heating the at least one fiber reinforced polyimide resin layer to promote flow and conformation to the first sealing surface and the second sealing surface; and
    curing the at least one fiber reinforced polyimide resin layer to provide a fluid tight seal between the first component and the second component.

2. The method of claim 1, further comprising compressing the first component towards the second component to a predetermined force after the at least one fiber reinforced polyimide resin layer has cured.

3. The method of claim 2, wherein heating the at least one fiber reinforced polyimide resin layer includes heating to between 600 degrees Fahrenheit and less than 750 degrees Fahrenheit.

4. The method of claim 1, wherein the at least one fiber reinforced polyimide resin layer includes fibers forming at least one of a fabric or a braid.

5. The method of claim 4, wherein the first component and the second component contribute to communicating at least one of bleed air, fuel, or lubricant in a gas turbine engine.

6. The method of claim 4, further comprising disassembling the first component from the second component during service by separating the first component from the second component after the at least one fiber reinforced polyimide resin layer has cured and bonded to the first component and the second component while maintaining the first component and the second component in reusable condition.

7. The method of claim 6, further comprising:
    locating at least one second fiber reinforced polyimide resin layer against the first sealing surface of the first component and against the second sealing surface of the second component;
    compressing at least one second fiber reinforced polyimide resin layer against the first sealing surface and the second sealing surface prior to curing the at least one second fiber reinforced polyimide resin layer;
    heating the at least one second fiber reinforced polyimide resin layer to conform to the first sealing surface and the second sealing surface; and
    curing the at least one fiber reinforced polyimide resin layer to provide a fluid tight seal between the first component and the second component.

8. The method of claim 1, further comprising coating at least one of the first sealing surface and the second sealing with an adhesion reducing material at least one of a frangible oxide, a frangible primer, a non-adherent film, or a non-adherent coating.

9. The method of claim 8, wherein the first sealing surface is located on an outer diameter of the first component with the first component being a first fluid tube and the second sealing surface is located on an inner diameter of the second component with the second component being a second fluid tube and the first and second sealing surfaces are in an axially overlapping relationship relative to a common longitudinal axis of first and second component.

10. The method of claim 1, wherein an outer diameter of the first component is less than an inner diameter defined by the second sealing surface of the second component and the first and second components are each a fluid tube.

11. The method of claim 1, wherein the first sealing surface is located on a first component flange with the first component being a first fluid tube and the second sealing surface is located on a second component flange with the second component being a second fluid tube and the first and second sealing surfaces are axially spaced from each other relative to a common longitudinal axis of first and second components, a clamp compressing the first component flange towards the second component flange, and the seal forms an annular ring.

12. The method of claim 1, further comprising isolating the first component from the second component with the at least one fiber reinforced polyimide resin layer to prevent material reactions between the first component and the second component.

13. The method of claim 1, further comprising bonding the at least one fiber reinforced polyimide to the first component and the second component, wherein at least one of the first sealing surface and the second sealing surface includes at least one of a surface irregularity and the at least one fiber reinforced polyimide resin layer conforms to the irregularity.

14. A gas turbine engine assembly comprising:
a first component including a first sealing surface;
a second component including a second sealing surface and the second component is in fluid communication with the first component; and
a seal engaging the first sealing surface and the second sealing surface forming a fluid tight connection between the first component and the second component, wherein the seal includes at least one fiber reinforced polyimide resin layer in a cured state that follows a profile of the first sealing surface and a profile of the second sealing surface, wherein the first surface and the second surface are each bonded to the seal to create a fluid tight seal and at least one of the first sealing surface and the second sealing surface includes at least one of a surface irregularity and the seal at least partially conforms to the surface irregularities.

15. The assembly of claim 14, wherein at least one of the first sealing surface and the second sealing surface are coated with at least one of the following adhesion reducing materials: a frangible oxide, a frangible primer, a non-adherent film, or a non-adherent coating.

16. The assembly of claim 14, wherein the at least one fiber reinforced polyimide resin layer prevents material reactions between the first component and the second component.

17. The assembly of claim 14, wherein the first sealing surface is located on a first component flange with the first component being a first fluid tube and the second sealing surface is located on a second component flange with the second component being a second fluid tube, the first and second sealing surfaces are axially spaced from each other relative to a common longitudinal axis of first and second component, a clamp for compressing the first component flange towards the second component flange, and the seal forms an annular ring.

18. The assembly of claim 14, wherein the first sealing surface is located on an outer diameter of the first component with the first component being a first fluid tube and the second sealing surface is located on an inner diameter of the second component with the second component being a second fluid tube and the first and second sealing surfaces are in an axially overlapping relationship relative to a common longitudinal axis of first and second component.

19. The assembly of claim 14, wherein the first sealing surface is located on an outer diameter of the first component with the first component being a first fluid tube and the second sealing surface is located on an outer diameter of the second component with the second component being a second fluid tube and a first sleeve half and a second sleeve half surround distal ends of the first and second components.

20. The assembly of claim 14, wherein the first sealing surface is located on an outer diameter of the first component with the first component being a first fluid tube and the second sealing surface is located on an outer diameter of the second component and the seal is wrapped around distal ends of the first and second components.

* * * * *